Feb. 23, 1971  H. FREEMAN  3,564,811
CUSHIONING MEMBER FOR PACKING AN ARTICLE IN A CONTAINER
Filed May 27, 1969  2 Sheets-Sheet 1

INVENTOR
HARRY FREEMAN
BY
Barlow & Barlow
ATTORNEYS

Feb. 23, 1971 H. FREEMAN 3,564,811
CUSHIONING MEMBER FOR PACKING AN ARTICLE IN A CONTAINER
Filed May 27, 1969 2 Sheets-Sheet 2

INVENTOR
HARRY FREEMAN
BY
Barlow & Barlow
ATTORNEYS

United States Patent Office
3,564,811
Patented Feb. 23, 1971

1

3,564,811
CUSHIONING MEMBER FOR PACKING AN ARTICLE IN A CONTAINER
Harry Freeman, Slatersville, R.I., assignor to Tainer Tech Corporation, a corporation of Delaware
Continuation-in-part of application Ser. No. 790,908, Jan. 14, 1969. This application May 27, 1969, Ser. No. 828,233
Int. Cl. B29d 27/00; B65b 3/04; B65d 85/30
U.S. Cl. 53—35                                    7 Claims

ABSTRACT OF THE DISCLOSURE

A cushion for an article in a container comprising a plurality of U shaped or apertured sections which are hinged together by an integral hinge, and a method of forming the sections from a rectangular block, the cushion consisting essentially of foamed plastic such as polyethylene with a hinged portion of the foamed plastic compacted into a linear form.

CROSS REFERENCE TO RELATED APPLICATIONS

This application is a continuation-in-part of application Ser. No. 790,908 filed Jan. 14, 1969.

BACKGROUND OF THE INVENTION

Corner supports are usually provided by molding or cutting right angular portions as shown in FIG. 14 of my Pat. No. 3,299,797, dated Sept. 3, 1968, or by notching a cylinder such as shown in Pat. 3,221,872. Substantial loss of material occurs in such forming.

SUMMARY OF THE INVENTION

A corner support for an article to be packed in a box comprising a block body of foam plastic with apertures in the block of a size to receive the article, the block being formed with a plurality of sections hingedly connected by a linear portion of the plastic to dispose the sections at right angles to each other, thus having one section which may receive an end of the article and another section receiving a side of the article. In some cases the folding or hinging relation to dispose the portions at right angles to each other may be formed by directing the hinges at right angles to each other and then folding on these hinges without notching or forming an aperture.

2

Figure 7:
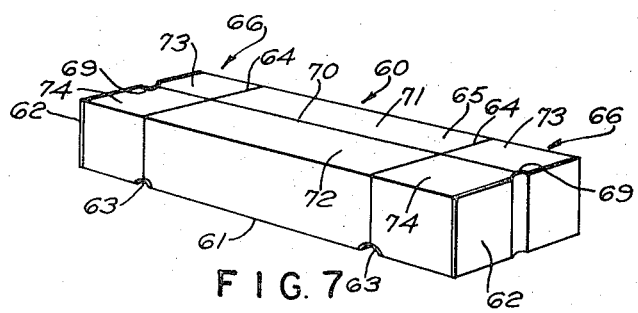
Figure 8:
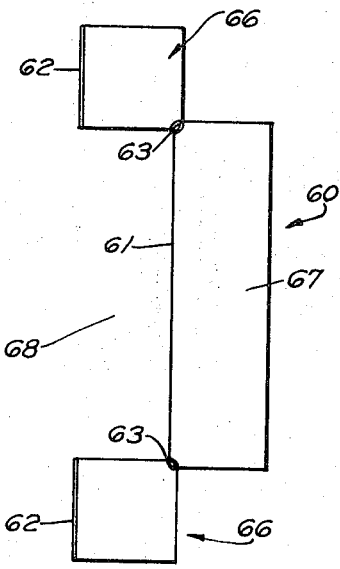
Figure 9:
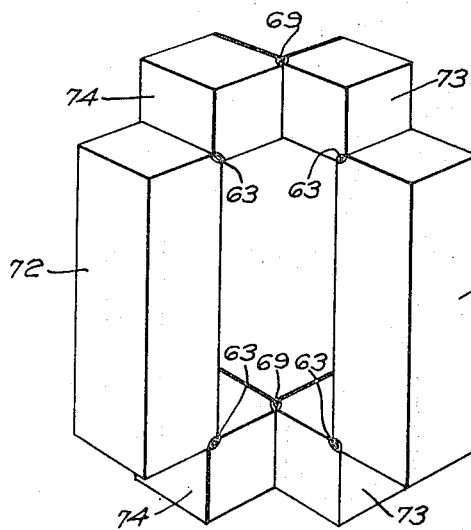
Figure 10:
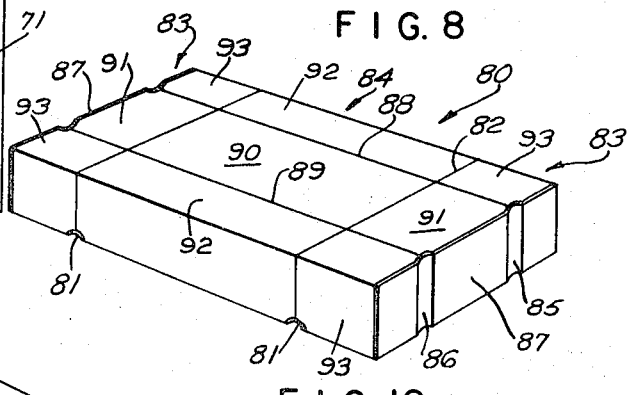
Figure 11:
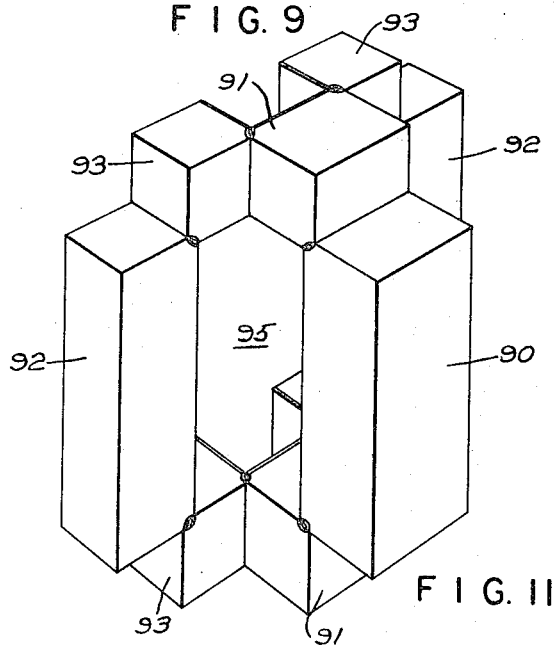

FIG. 7 is a perspective view illustrating a block of foam plastic material with lines indicating slits in the block;

FIG. 8 is an elevation showing the end sub-sections of the block swung about a hinge through 90°;

FIG. 9 is a perspective view illustrating a further position of two sections of the block swung to a position 90° from each other and in a form to receive an article to be cushioned;

FIG. 10 is a perspective view of a block slit in a manner similar to that shown in FIG. 7 and provided with hinged means; and FIG. 11 is a perspective view similar to FIG. 9 of the block shown in FIG. 10 open to its desired finished position for receiving an article therin.

DESCRIPTION OF THE PREFERRED EMBODIMENTS

Figure 1:
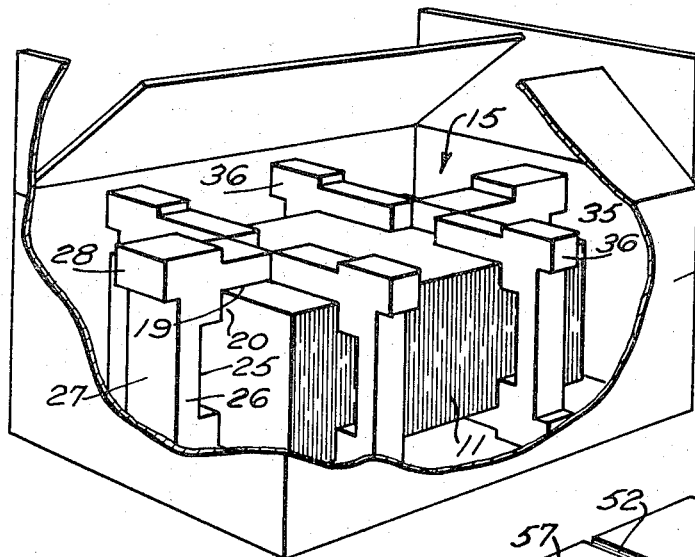
FIG. 1 is a perspective view showing an article supported by the cushion of this invention in a box which is broken away to illustrate the interior thereof.
Figure 5:
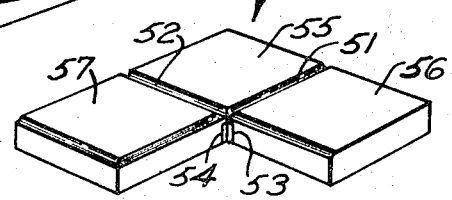
FIG. 5 is a perspective view of a further modified form showing hinge portions at right angles to each other.

In FIG. 1 there is a container 10 with an article 11 to be supported in that container. For supporting this article in the container so that it cannot move with reference to the container is a cushion 15 which is formed of foam plastic material, such as polyethylene, which in the preform comprises a block which has an aperture 17 providing a generally U shape with legs 18 spaced apart so that their inner surfaces 19 are a distance to receive the article 11 in one of its dimensions. Shoulders 20 my be provided to limit the insertion of the legs of the block onto the article, and a further aperture or recess 25 may be provided to allow some flexing along a portion 26, this further being enhanced by a cutout as at 27 providing protuberances 28 which may engage the inside of the container. This block is made sufficiently thick so that it may serve as three right-angularly extending supports which are conveniently formed by two severings to provide three sections hinged at 30 along the ends of the U shape legs 18 which is done by heating the end portions of the legs to a temperature substantially the melting point of the plastic which is foamed, and then compressing this foam about ⅛ of an inch to densify the foam and provide a linear or solid portion of the plastic along this surface which is to act as a hinge, thereby increasing its structural strength. Severing of the block with a hot cutter for separation at 31 and 32 provides three sections, there being a center section 35 and end sections 36. The severing stops short of the solid portion or linear portion to leave an integral hinge 30, and these sections may be swung about this hinge so that the sections 36 are substantially in one plane while the section 35 extends at right angles to that plane as in FIG. 1. These three sections all as one unit may then be slid over the end of the article 11 so as to support the box in three right angular directions in the container 10.

Figure 4:
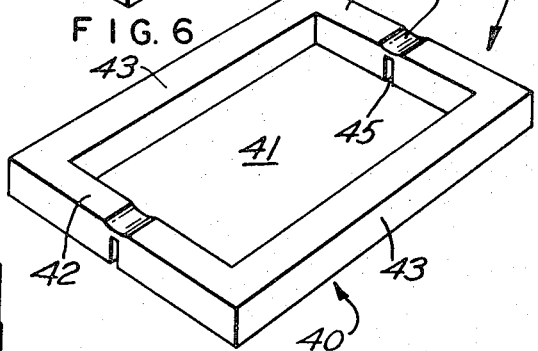
FIG. 4 is a perspective view of a frame-like part from which the cushion of FIG. 3 is formed.
Figure 3:
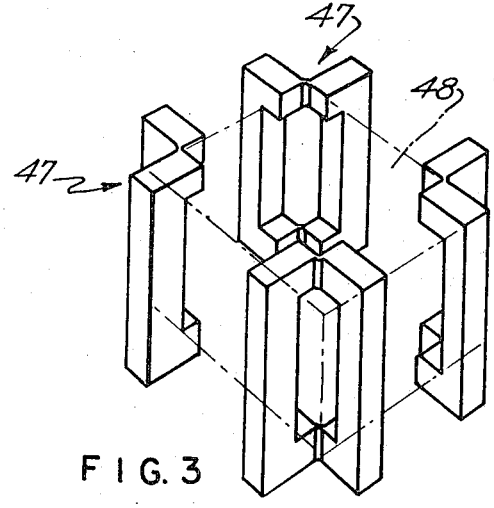
FIG. 3 shows the modified form of cushion having two parts instead of three and as in position on an article to be supported.

In some cases the foam cushion may have a rectangular frame shape as seen in FIG. 4 at 40 with an open center 41 and ends 42 with sides 43, and by contacting the ends 42 at their mid portion with a hot surface the foam is densified to linear form 44, while at the same time by contacting the surface opposite with a hot cutter, a slot 45 may be formed approaching but spaced from the linear form 44 so that a hinge is provided permitting the two sections 46 and 47 to be swung to a right angular position as shown in FIG. 3 to accommodate an article 48 shown therein.

Figure 6:
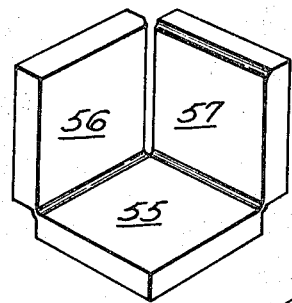
FIG. 6 is a perspective view of the portions of FIG. 5 bent into a corner support for an article to be shipped.

In some cases a block 50 may be provided of generally L form and its surfaces in right angular formation as at 51 and 52 densified to linear form by heat and at the same time slit as at 53 and 54 to a point near the linear portion leaving a hinge so as to provide a center section 55 and end sections 56 and 57 which may be folded at right angles to each other as shown in FIG. 6 to receive the corner of a rectilinear article.

In each of these cases the folding provides a pocket of a size and shape to receive the article to be supported in the container, and the dimensions are predetermined so that a compressible cushion of the foam plastic is provided between the article and the container on two or more sides of the article by use of a single unit.

Figure 2:
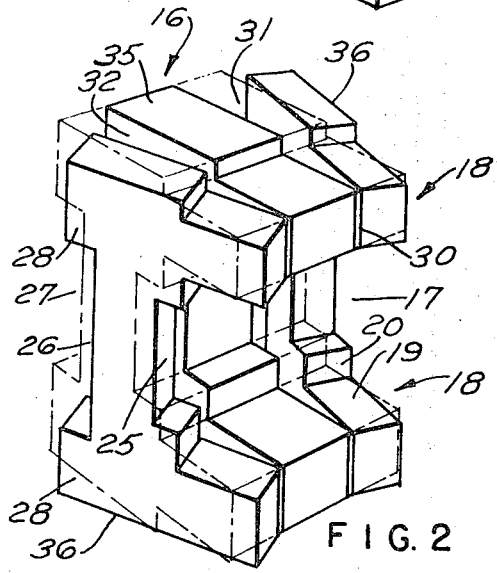
FIG. 2 shows the cushion in three sections as in folded form prior to swinging to positions at right angles to each other around the hinge.

In the showings in FIGS. 1 to 4 there has been material removed to provide the aperture 17 in FIG. 2, or the open center 41 in FIG. 4. Such removed material usually becomes waste, and in order to provide for the more economical use of material a construction may be used such as in FIGS. 7 to 11 in which the material is so utilized as to provide no waste. In these figures, legs 18 of FIG. 2 or 42 of FIG. 4 are formed from the block material by providing a hinge to form an end sub-section so that this end sub-section is hinged to the body section of the block and may be swung through substantially 90° to provide such legs.

In FIG. 7 a block 60 of generally rectangular form is provided with generally right angularly extending surfaces. The lower surface shown in FIG. 7 and designated 61 is referred to as a face surface, while the surfaces 62 at the ends of the block are referred to as end surfaces. At points spaced from the end surfaces 62 the foam material of the block 60 is densified into linear form as at 63 extending laterally of the face surface 61 and the block is slit along the line 64 from a surface 65 opposite the face surface 61 to a location approximately to the densified area 63 and as this extends laterally of the block it provides at either end, end sub-sections designated generally 66 which may be swung about the hinge connection 63 as seen in FIG. 8 to a position at generally right angles to the body section 67 of the block, thus providing an aperture 68 comparable to the aperture 17 as shown in FIG. 2 and the section 66 performs the function of the legs 18 as shown in FIG. 2.

The ends 62 are provided with a densified area 69 the densification being sufficient to provide a substantially linear form of the foam material which is done by heat and pressure as above explained and this occurs at both ends of the block as shown in FIG. 7.

A second slit is now performed at 70 extending lengthwise of the block and extending completely through the body portion 67 and into the end sections 66 to a point stopping at the densified areas 69. This slit 70 will divide the body into two main or body sections 71 and 72 and the end sub-sections into two sub-sections 73 and 74. Thus the two parts of the end sub-sections and the body section may be swung about the hinge connection 69 so as to dispose the parts 71, 72, 73 and 74 at substantially right angles to each as shown in FIG. 9 and in this position the cushion is substantially equivalent to the showing in FIG. 3 so as to receive a rectangular article such as 48 shown in FIG. 3.

In FIG. 10 the block 80 is provided with a densified lateral extending portion 81 similar to the showing at 63 in FIG. 7 and a lateral slit 82 extends across the block providing end sub-sections 83 at either end of the block comparable to the end sub-sections 66 of FIG. 7 while leaving the body portion 84 between the end sections. Similarly the end sub-sections may be swung about hinge 81 to a position shown comparable to FIG. 8 but in the case of the block 80 I have provided at each end two areas 85 and 86 which have been densified to linear form on the ends 87 of the block such as by heating and pressing and I have provided two slits 88 and 89 parallel to each other extending through the body portion 84 and into the end sub-sections 83 stopping at the densified areas 85 and 86 of the end sections thus providing in this case a center section 90 of the body and end center sub-sections 91 and side sections 92 at either side of this center section 90 and end sub-sections 93 at either side of the sub-sections 91 which enables the side sections 92 to be swung through 90° from the center part 90 to the position shown in FIG. 11 thus providing an aperture 95 similar to the aperture 17 of FIG. 2 for the reception of an article such as 11 shown in FIG. 1 by the sections extending along either side and along the ends of the article.

By the above arrangement it will be apparent that the foam plastic may be formed into the protecting cushion device for an article to be placed in a box without the scrapping of any material.

I claim:

1. The method of providing cushioning for a generally rectangular article in a generally rectangular container which comprises forming a cushion from a block of foamed plastic having generally right angular face and end surfaces which comprises densifying the face surface of the block at a point spaced from the block end to linear form and slitting the block from the opposite surface to a location close to the linear form so that the densified foam provides a hinge connection for an end sub-section to the body, densifying the end surface of the end sub-section to linear form and slitting the block at right angles and across the first hinge to a location close to the linear form on the end surface to provide a second hinge extending generally at right angles to the first hinge and connecting two secetions of the end sub-section but completely disconnecting two body sections, and then swinging the end sub-section about its hinge through generally 90° and the swinging of the end sub-section and body sections about the second hinge through generally 90° to provide right angular surfaces and fitting said right angular surfaces about said article and then fitting the article so enhanced into said container.

2. The method of forming a cushion from a block of foamed plastic having generally right angular face and end surfaces for packing an article which comprises densifying the face surface of the block at a point spaced from the block end to linear form and slitting the block from the opposite surface to a location close to the linear form so that the densified foam provides a hinge connection for an end sub-section to the body, densifying the end surface of the end sub-section to linear form and slitting the block at right angles and across the first hinge to a location close to the linear form on the end surface to provide a second hinge extending generally at right angles to the first hinge and connecting two sections of the end sub-section but completely disconnecting two body sections.

3. The method of claim 2 with the continuing steps of then swinging the end sub-section about its hinge through generally 90° and the swinging of the end sub-section and body sections about the second hinge through generally 90° to provide right angular surfaces to receive adjacent right angular surfaces of a generally right angular article.

4. The method of claim 2 wherein the first densification and slitting is provided adjacent opposite ends of the block and the second densification is at both ends of the block with the slitting being substantially equal in each end sub-section.

5. The method of claim 4 with the continuing steps of swinging both end sub-sections through 90° and then swinging the end sub-section parts and body sections about the second hinge through 90° to provide two generally U shape parts for receiving the corner of a generally right angular article.

6. The method of claim 2 wherein the second slitting comprises spaced parallel slits providing at least two parallel hinges connecting at least three sections of the end-subsection and completely disconnecting three sections of the body.

7. The method of claim 6 continuing with the steps of swinging the end sections about its hinge through generally 90° and then swinging the end subsections and body sections about the second hinge to position two of the sections at right angles to an intermediate section.

References Cited

UNITED STATES PATENTS

| | | | |
|---|---|---|---|
| 296,118 | 4/1884 | Boniface | 63—11 |
| 2,867,222 | 1/1959 | Otto et al. | 264—321 |
| 2,978,136 | 4/1961 | Ehrenfreund | 220—9(F) |
| 3,166,227 | 1/1965 | Ragnow | 229—14(C) |
| 3,222,437 | 12/1965 | Schilling | 264—54 |
| 3,251,382 | 5/1966 | Tatsch | 220—9(FUX) |
| 3,447,199 | 6/1969 | Trimble | 220—31(S.R.) |

WILLIAM T. DIXSON, Jr., Primary Examiner

U.S. Cl. X.R.

206—46; 229—14; 264—321